(12) United States Patent
Wang et al.

(10) Patent No.: US 8,560,749 B2
(45) Date of Patent: Oct. 15, 2013

(54) TECHNIQUES FOR MANAGING POWER CONSUMPTION STATE OF A PROCESSOR INVOLVING USE OF LATENCY TOLERANCE REPORT VALUE

(75) Inventors: Ren Wang, Portland, OR (US); Mesut A. Ergin, Portland, OR (US); Tsung-Yuan C. Tai, Portland, OR (US); Jr-Shian Tsai, Portland, OR (US); Prakash N. Iyer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 13/025,492

(22) Filed: Feb. 11, 2011

(65) Prior Publication Data

US 2012/0210032 A1 Aug. 16, 2012

(51) Int. Cl.
*G06F 13/24* (2006.01)
(52) U.S. Cl.
CPC ..................................... *G06F 13/24* (2013.01)
USPC .......................................... 710/267; 710/260
(58) Field of Classification Search
USPC ........................... 710/260–269; 713/300–340
See application file for complete search history.

(56) References Cited

U.S. PATENT DOCUMENTS

| 6,185,639 | B1* | 2/2001 | Kailash et al. ................... 710/48 |
| 6,467,008 | B1* | 10/2002 | Gentry et al. ................... 710/261 |
| 7,627,705 | B2* | 12/2009 | Agarwal ........................ 710/265 |
| 7,716,506 | B1* | 5/2010 | Surgutchik et al. ........... 713/321 |
| 7,752,353 | B2* | 7/2010 | Perry et al. ....................... 710/48 |
| 8,015,337 | B2* | 9/2011 | Kocherry et al. .............. 710/262 |
| 8,135,884 | B1* | 3/2012 | Sullam et al. .................... 710/48 |
| 8,176,341 | B2* | 5/2012 | Jeyaseelan et al. ............ 713/300 |
| 2006/0064529 | A1* | 3/2006 | Anand et al. ................... 710/260 |
| 2007/0218939 | A1 | 9/2007 | Lim et al. |
| 2008/0077722 | A1* | 3/2008 | Tang et al. ..................... 710/260 |
| 2008/0126618 | A1* | 5/2008 | Pardo .............................. 710/48 |
| 2008/0147946 | A1* | 6/2008 | Pesavento et al. ............. 710/265 |
| 2009/0172434 | A1 | 7/2009 | Kwa et al. |
| 2009/0249103 | A1 | 10/2009 | Jeyaseelan et al. |
| 2009/0319212 | A1* | 12/2009 | Cech et al. ....................... 702/65 |
| 2009/0327533 | A1* | 12/2009 | Kallam et al. ................... 710/25 |
| 2011/0314198 | A1* | 12/2011 | Liu et al. ........................ 710/260 |
| 2012/0191995 | A1* | 7/2012 | Naveh et al. ................... 713/320 |

FOREIGN PATENT DOCUMENTS

WO 2010-022376 A2 2/2010
WO 2012/109564 A2 8/2012

OTHER PUBLICATIONS

International Search Report and Written Opinion received in PCT Application No. PCT/US2012/024689, mailed Oct. 12, 2012, 7 pages.

\* cited by examiner

*Primary Examiner* — Raymond Phan
(74) *Attorney, Agent, or Firm* — Christopher K. Gagne

(57) ABSTRACT

Techniques are described for determining a temporary latency tolerance report (tLTR) value. A processing unit has to respond to a device interrupt within a duration specified by tLTR to ensure no incoming data is lost due to device buffer overflow. The tLTR value can be used to prevent the processing unit from entering too deep a sleep state when a device driver anticipates multiple sequential interrupts for a transaction.

19 Claims, 3 Drawing Sheets

TECHNIQUES FOR MANAGING POWER CONSUMPTION STATE OF A PROCESSOR INVOLVING USE OF LATENCY TOLERANCE REPORT VALUE

FIELD

The subject matter disclosed herein relates generally to techniques for managing power consumption by a device.

RELATED ART

Mobile devices such as laptop computers, tablet computers, and handheld devices interface with devices that provide operations such as network connectivity and audio and video interfaces. Communications between the devices and a central processing unit (CPU) of a host system can be driven either by the device via interrupts or by the host via polling. The interrupt driven approach is generally more power-efficient because it allows the host and device to stay in low power state when possible.

For considerations such as low power usage, performance, and implementation cost, devices are connected to platforms using interfaces such as PCI express (PCIe) and USB as well as other emerging interfaces such as Secure Digital Input Output (SDIO) Specification versions 3.0 and 4.0 and revisions and variations thereof. SDIO-based devices generate multiple sequential and closed-spaced interrupts for one transaction. The multiple sequential and closed-spaced interrupts can cause serious degradation in terms of throughput of communications between the platform and another device as well as power consumption of the CPU and devices.

A network interface that uses an SDIO interface may generate multiple interrupts for one transaction. In the case of a network interface, a single transaction may include receiving or sending one packet. For example, when the network interface uses an SDIO interface, the network interface issues multiple interrupts to indicate receipt of a packet, request processing of the packet by the host, and transfer the packet for processing by the host. By contrast, in the case of PCIe, when a network interface receives a packet, the network interfaces would transfer the packet by direct memory access (DMA) to the host without asking and issue a single interrupt after the DMA is completed.

For example, when a device uses an SDIO interface, there can be total of seven (or more depending on the device and driver specification) interrupts that are closely spaced to complete one transaction. According to the SDIO standards, these interrupts are sequential, i.e., the device only issues the next interrupt after the previous one has been processed by the host and the device receives the response. At any given time, there could be only one outstanding interrupt. As a result, interrupts cannot be bundled together and presented to the host in one group of interrupts.

When an OS kernel is compatible with the Linux OS, the OS estimates the next idle duration based on historical information and using a certain averaging mechanism and next timer information. This mechanism performs reasonably well when timer interrupts are the main interrupt source. In the case of an IEEE 802.11 compatible network interface that is coupled to a host with an SDIO interface and generates closely spaced interrupts, it takes multiple iterations for the averaging mechanism to react to the short idle durations. This can cause CPU to enter lower power state (for example C6) multiple times before the CPU corrects its course and enters a shallower power state and can react to frequent interrupts more rapidly.

FIG. 1 depicts an example of a CPU entering a deep sleep C6 state between interrupts. State C6 resume latency Rx is much longer than that of a shallower state (e.g., 140 microseconds for C6 versus 1 microsecond for C1). Because the interrupts are sequential, the delay for each interrupt adds up, causing a much longer delay for the entire transaction. This delay limits the total throughput to be much lower than the physical bandwidth available. For example, in one specific setup, the achieved throughput is below 10 Mbps while the available bandwidth is more than 20 Mbps. The available bandwidth can be achieved if the CPU does not enter low power state. In some cases, for transactions such as TCP-based communications, responses to received communications may be slower and consequently the round trip time (RTT) may be unacceptable. Besides the performance degradation, entering deeper power saving state between interrupts may consume more power because energy is used to power down and power up the CPU. Measurements show that the TCP-based communication throughput between a platform and a local access point decreases and CPU power usage increases substantially when the CPU receives multiple sequential closely-spaced interrupts and the CPU scheduling policy is the Linux default idle governor. In some cases, it is desirable to reduce power consumption of the CPU but also improve throughput between a platform and access point when multiple sequential closely-spaced interrupts are received.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
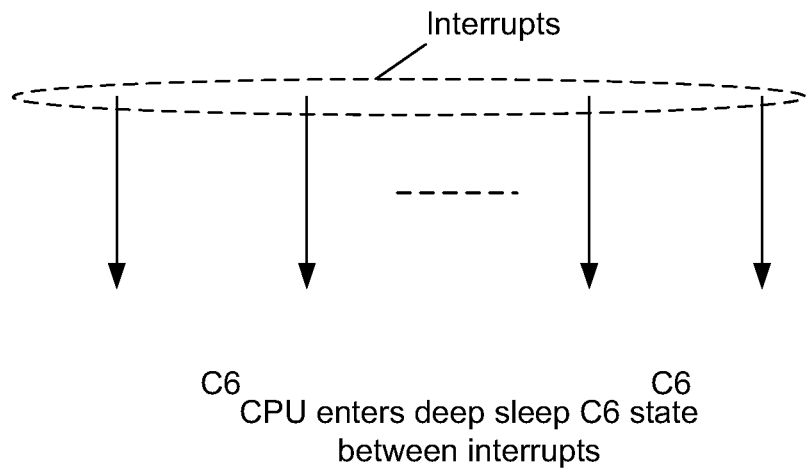
FIG. 1 depicts an example of a CPU entering a deep sleep state between interrupts.
Figure 2:
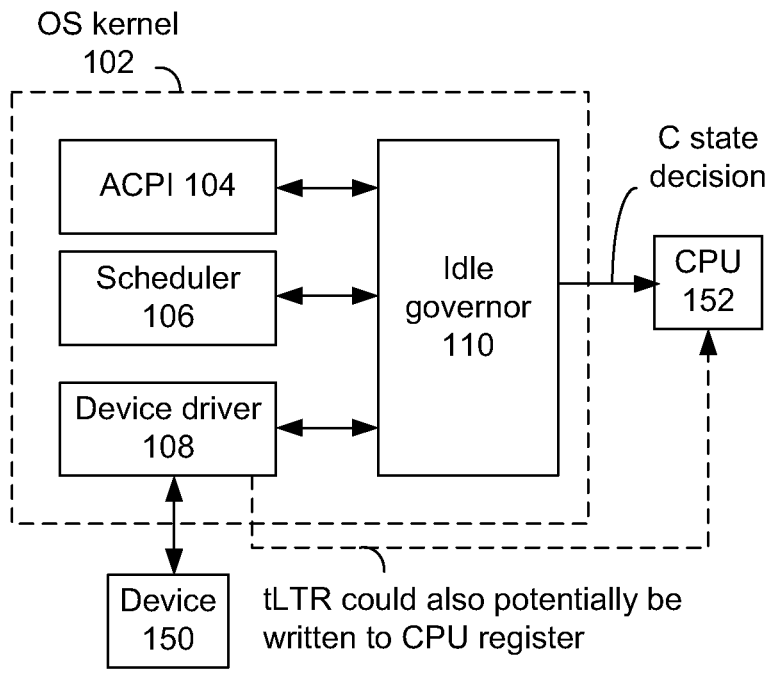
FIG. 2 depicts an example system in accordance with an embodiment.

FIG. 2 depicts an example system in accordance with an embodiment. This system can include an operating system (OS) kernel 102 that communicates with device 150 and central processing unit (CPU) 152. OS kernel 102 can be Linux or Microsoft Windows compatible. Device 150 can be any type of device such as a wireless or wire line network interface, storage device, display devices, or user interface devices such as a touch screen. CPU 152 can be replaced by one or more processing cores and/or threads per core.

OS 102 can cause CPU 152 to enter a deeper power saving state Cx. For example, the idle state can be any of C1, C2, C4 or C6. Idle states C1, C2, C4 or C6 are associated with processors from Intel Corporation, however idle states for other processors can be used. Multiple idle states could be available where in successive idle states, the CPU exhibits decreased power consumption. For these idle states, the clock signal for CPU 152 can be stopped and the internal CPU voltage can be reduced. In general, the higher the numeral for the idle state, the lower the power consumed. A lower power state consumes less power but there is a longer time to enter and exit the lower power state. In addition, the lower power states require longer energy break-even time, i.e., time to remain in that lower power state to justify entering and exiting that state.

Advanced Configuration and Power Interface (ACPI) 104 can provide processor-related information to the kernel space so that other routines that run in the kernel space can access that information. Processor-related information can include an energy breakeven time (Ex) and resume latency (Rx) for different Cx power states. An energy break-even time is a time taken for a device to recoup the power consumed to enter and exit a lower power state, Cx. Each Cx state has an associated resume latency of Rx to return to C0 state. Instead of using ACPI, Unified Extensible Firmware Interface (UEFI), Simple Firmware Interface (SFI), or hardcoded processor related information in the kernel can be used.

Scheduler 106 schedules a timer for CPU 152. When CPU 152 enters a sleep state from state C0, the timer determines when the CPU 152 is to recover to C0 state.

Device driver 108 is provided by the designer of device 150. In various embodiments, device driver 108 is to determine a temporary latency tolerance report (tLTR) value for device 150. CPU 152 has to respond to the interrupt within a duration specified by tLTR to ensure no incoming data is lost due to device buffer overflow. The tLTR value can be used to prevent the CPU from entering too deep a C state when device driver 108 anticipates multiple sequential interrupts for a transaction. In general, when the CPU goes into a deeper sleep state, CPU response will be slower due to the longer resume latency. Thus, if the device rapidly generates interrupts, the tLTR can be set to a small value to potentially prevent the CPU from going into too deep a sleep state and thereby taking too long to exit sleep state and return to normal operation (e.g., C0) and responding too slowly to interrupts. On the other hand, in some cases, the tLTR can be set to a larger value if a delay in processing interrupts is acceptable and additional power savings from the CPU entering a deeper sleep state is desired.

In some cases, the tLTR value is chosen to be roughly the same value as the interval between two interrupts from device 150 to its host to allow the host to respond in sufficient time. The interval between interrupts can be obtained either at design time as a device property or by device driver 108 observing the interval between interrupts during run-time. The device property can include how fast the device can issue interrupts.

Various techniques can be used to observe the interval between interrupts during run-time. For example, driver 108 can post a relatively large tLTR value and observe the interrupt interval from device 150. Driver 108 can gradually reduce the tLTR value until the interval between interrupts converges to a relatively regular interval. In another example, driver 108 can issue a tLTR of zero to attempt to keep the CPU at C0 state for a short period of time. Driver 108 can observe the interval between multiple device interrupts and the observed interval value can be used as tLTR. In another example, driver 108 can observe interrupt intervals during a period of time and determine the average interrupt interval. The tLTR can be set as the average interrupt value.

The tLTR value can be determined based on an IO counter value. A look up table can be used convert an IO counter value to an tLTR value. A conversion equation can be used to convert IO counter to tLTR value. The IO counter can be a counter indicating a number of ongoing input/output (IO) activities for IO devices. For example, the IO counter can indicate a total number of input and output requests to a memory channel.

If interrupt intervals are longer than the maximum Ex, which corresponds to energy break even time for the deepest Cx state, then the default device LTR value is not modified to be tLTR because the CPU does not need to respond faster even in its deepest sleep state. If interrupt intervals are shorter than the maximum Ex, then device driver 108 posts tLTR. Device driver 108 can obtain the Ex value, for example, from ACPI table 104 or another source. The driver obtains Ex to decide whether it needs to post tLTR instead of LTR. The idle governor later compares tLTR to Rx to determine which state to enter. In addition, device driver 108 compares tLTR to the default device LTR for device 150. If tLTR is larger than device default LTR, then device driver 108 provides the device default LTR instead of the determined tLTR because the device default LTR sets the upper bound on the response time to interrupts by CPU 152.

In some cases, device driver 108 can scale down or scale up the tLTR value depending on whether responsiveness to interrupts or power savings is desired. If responsiveness to interrupts is desired, which increases throughput, device driver 108 can reduce the tLTR value. If CPU power savings is desired, device driver 108 can increase the tLTR value.

Driver 108 can provide the determined tLTR value to idle governor 110 in response a first interrupt from device 150 in a transaction after the transaction in which interrupts were measured to determine the tLTR value. In some cases, driver 108 can provide the tLTR in response to an interrupt, but not the first interrupt, in the same transaction in which interrupts were measured to determine the tLTR value. After receiving the last interrupt in a transaction from device 150, device driver 108 posts the default device LTR value to idle governor 110 so idle governor 110 will resume its normal operation.

When a device malfunction occurs during an ongoing transaction, driver 108 is responsible for resetting the tLTR to the default LTR so that the CPU is not stuck in a shallower C state indefinitely.

In some cases, device driver 108 can write the tLTR value to a register of CPU 152. The tLTR communication can be made from driver 108 via a hardware LTR channel to the CPU's policy controller. In some cases, idle governor 110 does not control the exact C state of CPU 152. For example, when idle governor 110 requests C3 state, CPU can instead enter C4, C5, or C6. CPU 152 can use the tLTR value to determine whether to enter C4, C5, or C6.

Idle governor 110 is to decide which lower power state (if any) that CPU 152 is to enter by considering at least two factors: (1) heuristic prediction and (2) device LTR or tLTR, as the case may be. Heuristic prediction involves prediction of how busy the CPU will be. When Linux compatible, OS 102 calculates expected idle duration by looking at past idle durations and timer information from scheduler 106. When Windows compatible, OS 102 calculates CPU utilization. The higher the CPU utilization, the shallower the C state.

When device 150 issues an interrupt, CPU 152 potentially responds to the interrupt within a duration specified by LTR (or tLTR as the case may be) to ensure no incoming data is lost due to device buffer overflow. Each Cx state has an associated resume latency of Rx to return from Cx state to C0 state.

Accordingly, the deepest Cx state that the CPU can enter has an associated Rx that is less than LTR (or tLTR).

For each Cx state, idle governor 110 checks LTR against its Rx to determine whether (a) LTR<Rx, (b) IO counter is <=a threshold, and (c) predicted idle duration>Ex. If any of these conditions are not met, then idle governor 110 will not enter that specific Cx state.

In some embodiments, instead of posting an tLTR value, device driver 108 posts an IO counter that is greater than the threshold so that idle governor 110 will not allow the CPU to enter some deeper Cx states. The driver resets the counter to zero to indicate a transaction is finished. The OS looks at IO counter and determines if transaction is active or not. OS operation can be adjusted to read the IO counter and decide which Cx state to enter.

When device 150 is a network interface coupled to a platform using SDIO, the LTR value is usually large enough (in the order of milliseconds) so as not to prevent CPU 152 from entering the deepest C state after processing an interrupt. Thus, the heuristic prediction above can be the deciding factor on which Cx state to enter after processing an interrupt. For example, if the C6 state energy break-even time is around 500 microseconds and the time gap between two interrupts is much shorter, then multiple interrupts cause a CPU power use penalty when CPU enters deep C state. In addition, the total processing time for one transaction becomes longer due to the CPU's slow response. This prevents the platform and device from entering low power state sooner and can increase total platform and device power consumption.

Benefits of various embodiments include, but are not a necessary feature: potentially improved speed of interrupt processing, potential platform power reduction, and no OS kernel or CPU policy changes.

Figure 3:
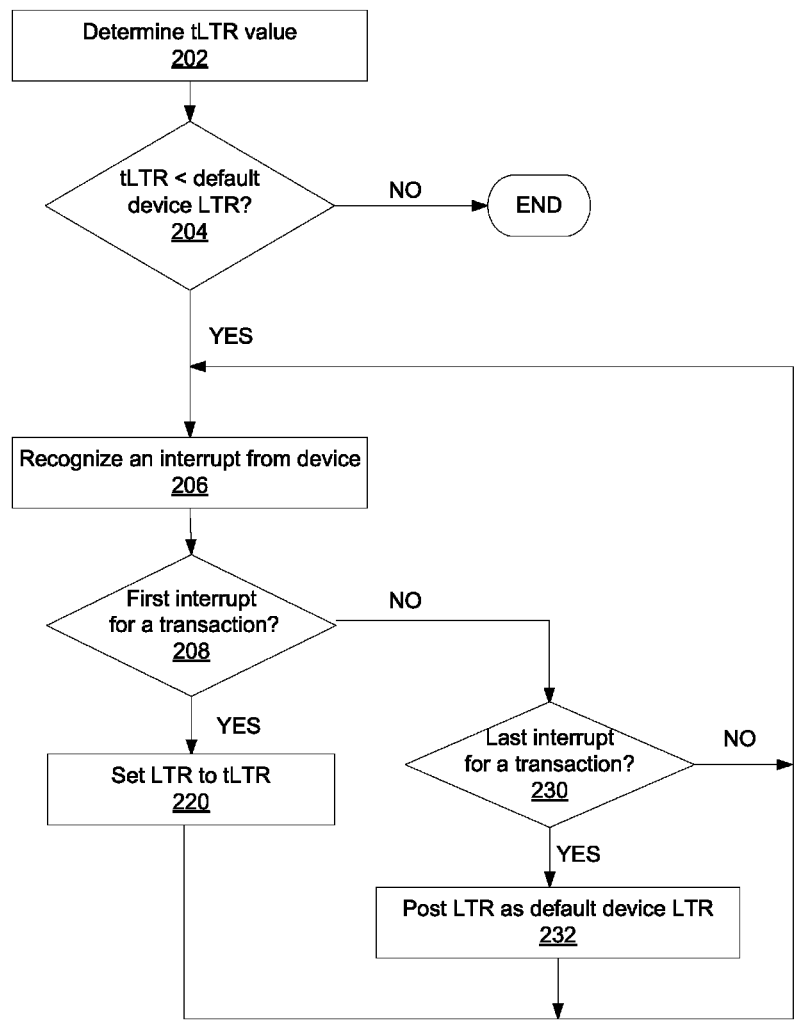
FIG. 3 depicts a process in accordance with an embodiment.

FIG. 3 depicts a process in accordance with an embodiment. This process can be performed by a device driver to set a latency tolerance report value. Block 202 includes determining a tLTR value. The tLTR value can be determined by gathering device interrupt interval information or recognizing device interrupt intervals during run-time. The tLTR value can be determined in a manner described with regard to device driver 108 of FIG. 2.

Block 204 includes determining whether the determined tLTR value is less than the default device LTR value. The default device LTR value can be the highest LTR value permitted by an idle governor. If the determined tLTR value is less than the default device LTR value, then block 206 follows block 204. If the determined tLTR value is not less than the default device LTR value, then the process ends.

Block 206 includes recognizing an interrupt from the device. Block 208 includes determining whether the interrupt is a first interrupt for a transaction. If the received interrupt is a first interrupt for a transaction, then block 220 follows block 208. If the received interrupt is not a first interrupt for a transaction, then block 230 follows block 208.

Block 220 includes setting the latency tolerance report (LTR) value to tLTR. Block 206 follows block 220.

Block 230 includes determining whether the received interrupt is a last interrupt for a transaction. For a last interrupt for a transaction, block 232 includes setting the default device LTR as the default device LTR value. For an interrupt other than a last interrupt for a transaction, block 206 follows block 230.

The embodiment of FIG. 3 is merely one example of a process to determine an LTR value to provide to an idle governor or CPU register. Instead of providing the tLTR value in response to a first interrupt in blocks 208 and 220, the tLTR can be provided for any interrupt in the same transaction. The tLTR can be re-evaluated periodically or when the interval between interrupts for a device changes and the new tLTR can be provided in response to a first or subsequent (but not last) interrupt in any transaction.

Figure 4:
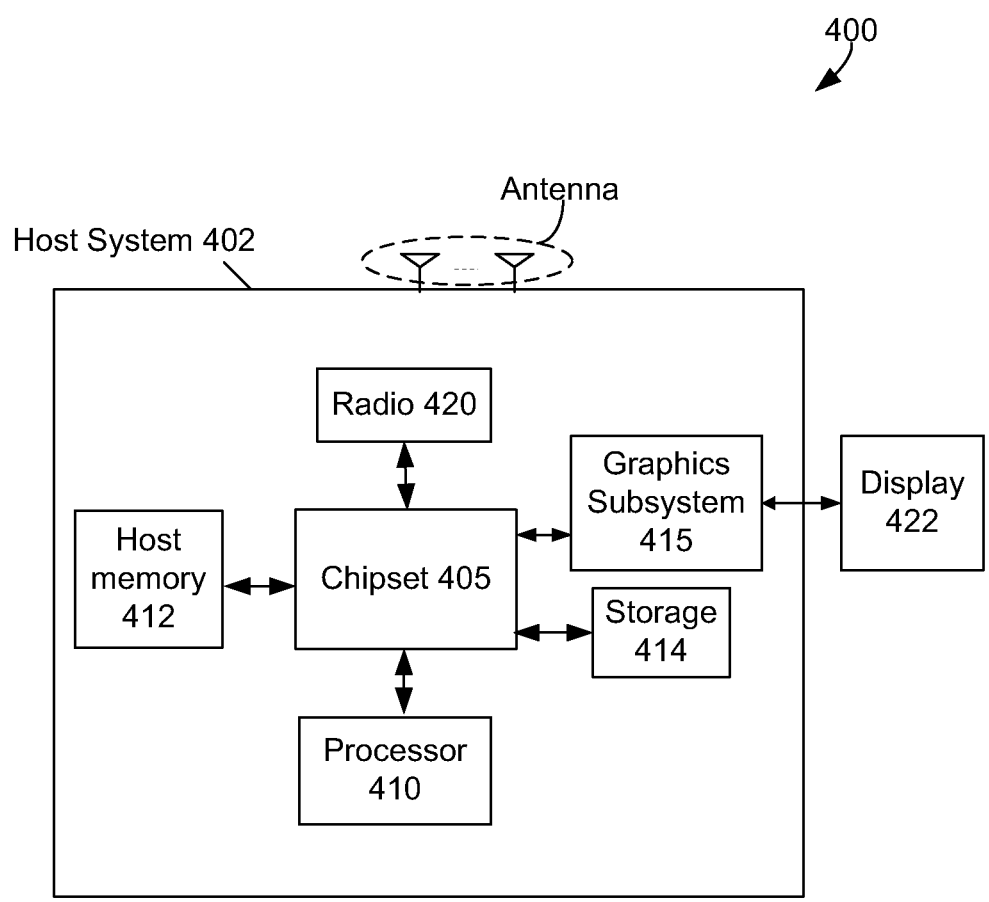
FIG. 4 depicts an example system that can use embodiments of the present invention.

FIG. 4 depicts an example system that can use embodiments of the present invention. Computer system 400 may include host system 402 and display 422. Computer system 400 can be implemented in a handheld personal computer, mobile telephone, set top box, or any computing device. Any type of user interface can be used such as a keypad, mouse, touch screen, and/or gesture or motion recognition. Host system 402 may include chipset 405, processor 410, host memory 412, storage 414, graphics subsystem 415, and radio 420. Chipset 405 may provide intercommunication among processor 410, host memory 412, storage 414, graphics subsystem 415, and radio 420. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit. Processor 410 can be configured to perform operations described herein to generate a latency tolerance report (LTR) value or temporary LTR value in accordance with embodiments described herein.

Host memory 412 may be implemented as a volatile memory device such as but not limited to a Random Access Memory (RAM), Dynamic Random Access Memory (DRAM), or Static RAM (SRAM). Storage 414 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 415 may perform processing of images such as still or video for display. An analog or digital interface may be used to communicatively couple graphics subsystem 415 and display 422. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

Radio 420 may include one or more radios capable of transmitting and receiving signals in accordance with applicable wireless standards such as but not limited to any version of IEEE 802.11, IEEE 802.16, and 3GPP LTE. For example, radio 420 may include at least a physical layer interface and media access controller.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method performed by a computer, the method comprising:
    determining a latency tolerance report value that specifies a time duration within which a processor is to respond to a device interrupt;
    recognizing the device interrupt for a transaction;
    providing a first latency tolerance report value in response to the device interrupt not being a last interrupt for the transaction, the first latency tolerance report value potentially preventing the processor from entering a level of sleep state between device interrupts; and
    providing a second latency tolerance report value in response to the device interrupt being a last interrupt for the transaction.

2. The method of claim 1, further comprising determining an interval between at least two device interrupts and wherein determining a latency tolerance report value is based on the interval.

3. The method of claim 1, wherein determining a latency tolerance report value is based on an I/O counter, the I/O counter indicating a total number of pending accesses by a device.

4. The method of claim 1, wherein providing a first latency tolerance report value in response to the device interrupt not being a last interrupt for the transaction comprises:
    determining whether to provide the first latency tolerance report value as either the determined latency tolerance report value or a default device latency tolerance report value.

5. The method of claim 1, wherein providing a first latency tolerance report value comprises:
    providing the determined latency tolerance report value as the first latency tolerance report value if the determined latency tolerance report value is less than a default device latency tolerance report value and
    providing the default device latency tolerance report value as the first latency tolerance report value if the determined latency tolerance report value is greater than the default device latency tolerance report value.

6. The method of claim 1, wherein providing a first latency tolerance report value in response to the device interrupt not being a last interrupt for the transaction comprises providing a first latency tolerance report value in response to recognizing the device interrupt is a first interrupt for the transaction.

7. The method of claim 1, wherein providing a second latency tolerance report value comprises providing a default device latency tolerance report value.

8. The method of claim 2, wherein determining an interval between at least two device interrupts comprises:
    monitoring receipt of interrupts from the device for a period of time and
    setting the interval as the average interval for the monitored received interrupts.

9. The method of claim 2, wherein determining an interval between at least two device interrupts comprises:
    retrieving a device property that specifies the interrupt interval.

10. A computer-readable medium that stores instructions that when executed by a computer, cause the computer to:
    determine a latency tolerance report value that specifies a time duration within which a processor is to respond to a device interrupt;
    recognize the device interrupt for a transaction;
    provide a first latency tolerance report value in response to the device interrupt not being a last interrupt for the transaction, the first latency tolerance report value potentially preventing the processor from entering a level of sleep state between device interrupts; and
    provide a second latency tolerance report value in response to the device interrupt being a last interrupt for the transaction.

11. The computer-readable medium of claim 10, wherein to determine a latency tolerance report value, the computer is to determine a latency tolerance report value based on an interval between device interrupts and wherein to determine an interval between device interrupts, the computer is to:
    monitor receipt of interrupts from the device for a period of time and set the interval as the average interval for the monitored received interrupts.

12. The computer-readable medium of claim 10, wherein to determine a latency tolerance report value, the computer is to determine a latency tolerance report value based on an I/O counter, the I/O counter indicating a total number of pending device accesses.

13. The computer-readable medium of claim 10, wherein to provide a first latency tolerance report value in response to the device interrupt not being a last interrupt for the transaction, the computer is to:
    provide the determined latency tolerance report value as the first latency tolerance report value if the determined latency tolerance report value is less than the default device latency tolerance report value and
    provide the default device latency tolerance report value as the first latency tolerance report value if the determined latency tolerance report value is greater than the default device latency tolerance report value.

14. The computer-readable medium of claim 10, wherein to provide a first latency tolerance report value in response to the device interrupt not being a last interrupt for the transaction, the computer is to provide a first latency tolerance report value in response to recognizing the device interrupt is a first interrupt for the transaction and to provide a second latency tolerance report value, the computer is to provide a default device latency tolerance report value.

15. A system comprising:
a display device;
an antenna;
a radio communicatively coupled to the antenna; and
a processor configured to:
   determine a latency tolerance report value that specifies a time duration within which the processor is to respond to a device interrupt;
   recognize the device interrupt for a transaction;
   provide a first latency tolerance report value in response to the device interrupt not being a last interrupt for the transaction, the first latency tolerance report value potentially preventing the processor from entering a level of sleep state between device interrupts; and
   provide a second latency tolerance report value in response to the device interrupt being a last interrupt for the transaction.

16. The system of claim 15, wherein to determine a latency tolerance report value, the processor is to determine a latency tolerance report value based on an interval between at least two device interrupts and wherein to determine an interval between device interrupts, the processor is to:
   monitor receipt of interrupts from the device for a period of time and set the interval as the average interval for the monitored received interrupts.

17. The system of claim 15, wherein to determine a latency tolerance report value, the processor is to determine a latency tolerance report value based on an I/O counter, the I/O counter indicating a total number of pending accesses by a device.

18. The system of claim 15, wherein to provide a first latency tolerance report value in response to the device interrupt not being a last interrupt for the transaction, the processor is to:
   provide the determined latency tolerance report value as the first latency tolerance report value if the determined latency tolerance report value is less than the default device latency tolerance report value and
   provide the default device latency tolerance report value as the first latency tolerance report value if the determined latency tolerance report value is greater than the default device latency tolerance report value.

19. The system of claim 15, wherein
   to provide a first latency tolerance report value in response to the device interrupt not being a last interrupt for the transaction, the processor is to provide a first latency tolerance report value in response to recognizing the device interrupt is a first interrupt for the transaction and
   to provide a second latency tolerance report value, the processor is to provide a default device latency tolerance report value.

\* \* \* \* \*